(12) United States Patent
Sivanesan et al.

(10) Patent No.: US 10,149,259 B2
(45) Date of Patent: Dec. 4, 2018

(54) POWER HEADROOM REPORTING WITH DUAL CONNECTIVITY

(71) Applicant: Intel IP Corporation, Santa Clara, CA (US)

(72) Inventors: Kathiravetpillai Sivanesan, Richardson, TX (US); Ali T. Koc, Portland, OR (US); Satish C. Jha, Hillsboro, OR (US); Rath Vannithamby, Portland, OR (US); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 28 days.

(21) Appl. No.: 15/276,091

(22) Filed: Sep. 26, 2016

(65) Prior Publication Data

US 2017/0013571 A1  Jan. 12, 2017

Related U.S. Application Data

(63) Continuation of application No. 14/495,729, filed on Sep. 24, 2014, now Pat. No. 9,480,029.

(Continued)

(51) Int. Cl.
*H04W 4/00* (2018.01)
*H04W 52/36* (2009.01)
(Continued)

(52) U.S. Cl.
CPC ....... *H04W 52/365* (2013.01); *H04W 52/146* (2013.01); *H04W 52/247* (2013.01);
(Continued)

(58) Field of Classification Search
CPC combination set(s) only.
See application file for complete search history.

(56) References Cited

U.S. PATENT DOCUMENTS 8,537,767 B2 * 9/2013 Zhang ................. H04W 52/365
                                                    37/252
9,961,648 B2 * 5/2018 Kwon ................. H04W 52/365
(Continued)

FOREIGN PATENT DOCUMENTS

CN    101595751 A    12/2009
JP    2013-533702    8/2013
(Continued)

OTHER PUBLICATIONS

International Search Report and Written Opinion dated Jan. 19, 2015 from International Application No. PCT/US2014/064426.
(Continued)

*Primary Examiner* — Frank Duong
(74) *Attorney, Agent, or Firm* — Schwabe, Williamson & Wyatt, P.C.

(57) ABSTRACT

Embodiments described herein relate generally to a communication between a user equipment ("UE") and a plurality of evolved Node Bs ("eNBs"). A UE may be adapted to operate in a dual connected mode on respective wireless cells provided by first and second eNBs. The UE may be adapted to estimate respective power headroom ("PHR") values associated with simultaneous operation on the first and second wireless cells. The UE may cause the first and second PHR estimates to be transmitted to both the first and second eNBs. The first and second eNBs may use these estimates to compute respective uplink transmission powers for the UE. Other embodiments may be described and/or claimed.

27 Claims, 13 Drawing Sheets

Related U.S. Application Data

(60) Provisional application No. 61/924,194, filed on Jan. 6, 2014.

(51) Int. Cl.
| | |
|---|---|
| *H04W 88/06* | (2009.01) |
| *H04W 52/34* | (2009.01) |
| *H04W 52/14* | (2009.01) |
| *H04W 52/24* | (2009.01) |
| *H04W 84/04* | (2009.01) |

(52) U.S. Cl.
CPC ......... *H04W 52/248* (2013.01); *H04W 52/34* (2013.01); *H04W 88/06* (2013.01); *H04W 84/042* (2013.01); *Y02D 70/126* (2018.01); *Y02D 70/14* (2018.01)

(56) References Cited

U.S. PATENT DOCUMENTS

| | | | |
|---|---|---|---|
| 9,992,755 B2* | 6/2018 | Yi | H04W 72/0413 |
| 2010/0103833 A1 | 4/2010 | Englund et al. | |
| 2012/0113845 A1 | 5/2012 | Kim et al. | |
| 2013/0315167 A1 | 11/2013 | Zhang et al. | |
| 2014/0023010 A1 | 1/2014 | Loehr et al. | |
| 2014/0211738 A1 | 7/2014 | Park et al. | |
| 2015/0003345 A1 | 1/2015 | Kuo | |
| 2015/0085760 A1* | 3/2015 | Yamada | H04W 24/10 370/329 |
| 2015/0124743 A1 | 5/2015 | Damnjanovic et al. | |
| 2015/0304966 A1 | 10/2015 | Park et al. | |
| 2015/0319716 A1* | 11/2015 | Park | H04W 16/32 370/329 |
| 2016/0066284 A1* | 3/2016 | Kwon | H04W 52/365 370/329 |
| 2016/0174160 A1* | 6/2016 | Shen | H04W 52/146 455/522 |
| 2016/0198421 A1* | 7/2016 | Yi | H04W 52/365 370/329 |
| 2016/0309423 A1* | 10/2016 | Lee | H04W 52/365 |

FOREIGN PATENT DOCUMENTS

| | | |
|---|---|---|
| JP | 2013545395 A | 12/2013 |
| KR | 2010-0014862 A | 2/2010 |
| KR | 2012-0048044 A | 5/2012 |
| KR | 10-2013-0058733 | 6/2013 |
| WO | WO2011043394 A1 | 4/2011 |
| WO | 2012060651 A2 | 5/2012 |
| WO | 2013025562 A2 | 2/2013 |
| WO | 2013048081 A2 | 4/2013 |

OTHER PUBLICATIONS

European Patent Office; Extended European Search Report dated Jul. 5, 2017 for Patent Application No. 14876206.5; 11 pages.
Japanese Patent Office; Office Action dated Aug. 1, 2017 for Patent Application No. 2016-535032; 6 pages.
Korean Intellectual Property Office; Office Action dated Aug. 18, 2017 for Patent Application No. 10-2016-7014681; 16 pages.
Samsung; "Power headroom report for inter-ENB CA," 3GPP TSG RAN WG2 #84, R2-133823, Agenda Item: 7.2.4; Nov. 11-15, 2013, San Francisco U.S.; 5 pages.
Japanese Patent Office—Office Action dated Feb. 6, 2018 from Japanese Patent Application No. 2016-535032, 5 pages.
Qualcomm Incorporated, "Procedures for dual connectivity," 3GPP TSG-RAN2#84, R2-134002, Agenda Item: 7.2.4, Nov. 11-15, 2013, San Francisco, USA, 5 pages.
European Patent Office—Article 94(3) dated Aug. 23, 2018 from European Patent Application No. 14876206.5, 11 pages.

* cited by examiner

| $C_7$ | $C_6$ | $C_5$ | $C_4$ | $C_3$ | $C_2$ | $C_1$ | R |
|---|---|---|---|---|---|---|---|
| P | V | PH (Type 2, PCell, MCG) | | | | | |
| R | R | $P_{CMAX,c}$ 1 | | | | | |
| P | V | PH (Type 1, PCell, MCG) | | | | | |
| R | R | $P_{CMAX,c}$ 2 | | | | | |
| P | V | PH (Type 1, SCell n, MCG) | | | | | |
| R | R | $P_{CMAX,c}$ n+2 | | | | | |

705

| P | V | PH (Type 2, PCell, SCG) |
|---|---|---|
| R | R | $P_{CMAX,c}$ w |
| P | V | PH (Type 1, PCell, SCG) |
| R | R | $P_{CMAX,c}$ x |
| P | V | PH (Type 1, SCell n, SCG) |
| R | R | $P_{CMAX,c}$ y |

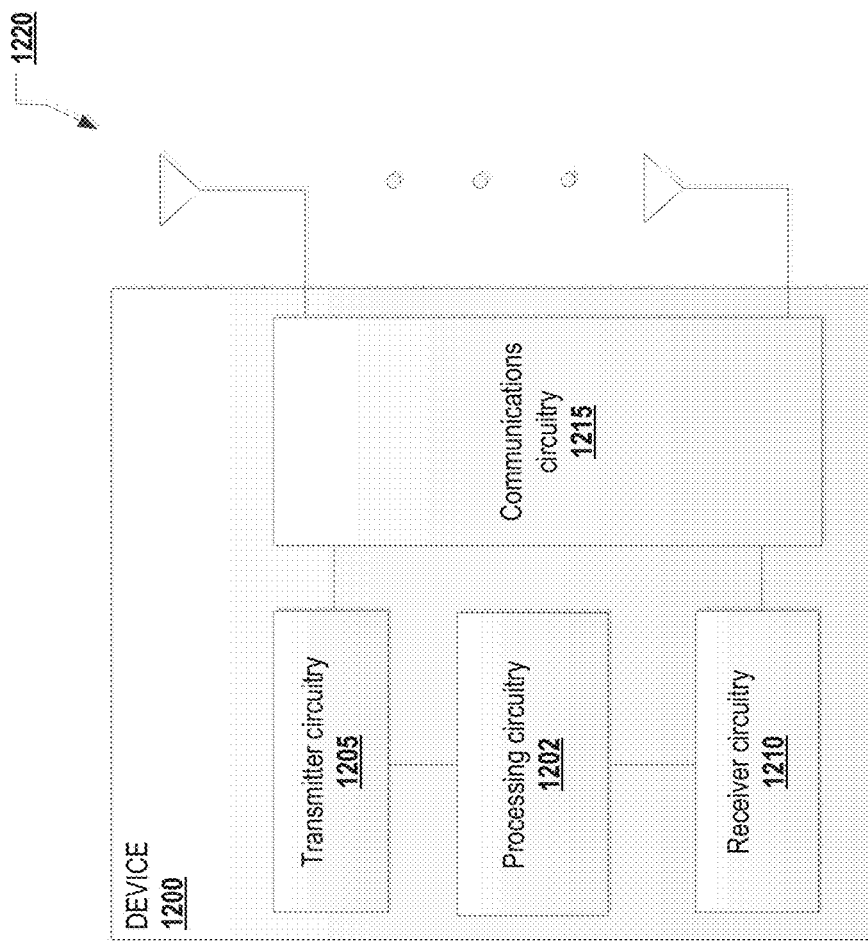

```
    periodicPHR-Timer-MCG-r12 ENUMERATED {sf10, sf20, sf50, sf100,
sf200, sf500, sf1000, infinity},
    periodicPHR-Timer-SCG-r12 ENUMERATED {sf10, sf20, sf50, sf100,
sf200, sf500, sf1000, infinity},
    prohibitPHR-Timer-MCG-r12 ENUMERATED {sf0, sf10, sf20, sf50,
sf100, sf200, sf500, sf1000},
    prohibitPHR-Timer-SCG-r12 ENUMERATED {sf0, sf10, sf20, sf50,
sf100, sf200, sf500, sf1000},
    dl-PathlossChange-MCG-r12 ENUMERATED {dB1, dB3, dB6, infinity}
    dl-PathlossChange-SCG-r12 ENUMERATED {dB1, dB3, dB6, infinity}
    }                       OPTIONAL, -- Need ON
    dualconnectivityPHR-r12         ENUMERATED {setup}
OPTIONAL -- Need OR
}                           OPTIONAL -- Need ON
```

Figure 13

POWER HEADROOM REPORTING WITH DUAL CONNECTIVITY

CROSS REFERENCE TO RELATED APPLICATIONS

This application is a continuation of U.S. patent application Ser. No. 14/495,729, filed Sep. 24, 2014, which claims priority under 35 U.S.C. § 119(e) to U.S. Provisional Patent Application 61/924,194 filed Jan. 6, 2014, both of which are hereby incorporated herein by reference in their entireties.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

In communicating with a base station, a user equipment ("UE") has a finite amount of power to apply to uplink resources for transmission to the base station. According to some standards, such as Long Term Evolution ("LTE"), a base station may assist the UE to efficiently allocate or manage uplink radio resources. For the base station to assist, the UE may report its power headroom ("PHR") to the base station in one or more uplink control channels. The base station would then determine how much more or less uplink bandwidth per subframe that the UE would be capable of using before reaching its maximum transmission power.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

FIG. 7 is a block diagram illustrating a MAC control element adapted for a UE that may operate in a dual connected mode, in accordance with various embodiments.

FIG. 12 is a block diagram illustrating a transmitting device, in accordance with various embodiments.

FIG. 13 is table illustrating a MAC-MainConfig information element, in accordance with various embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
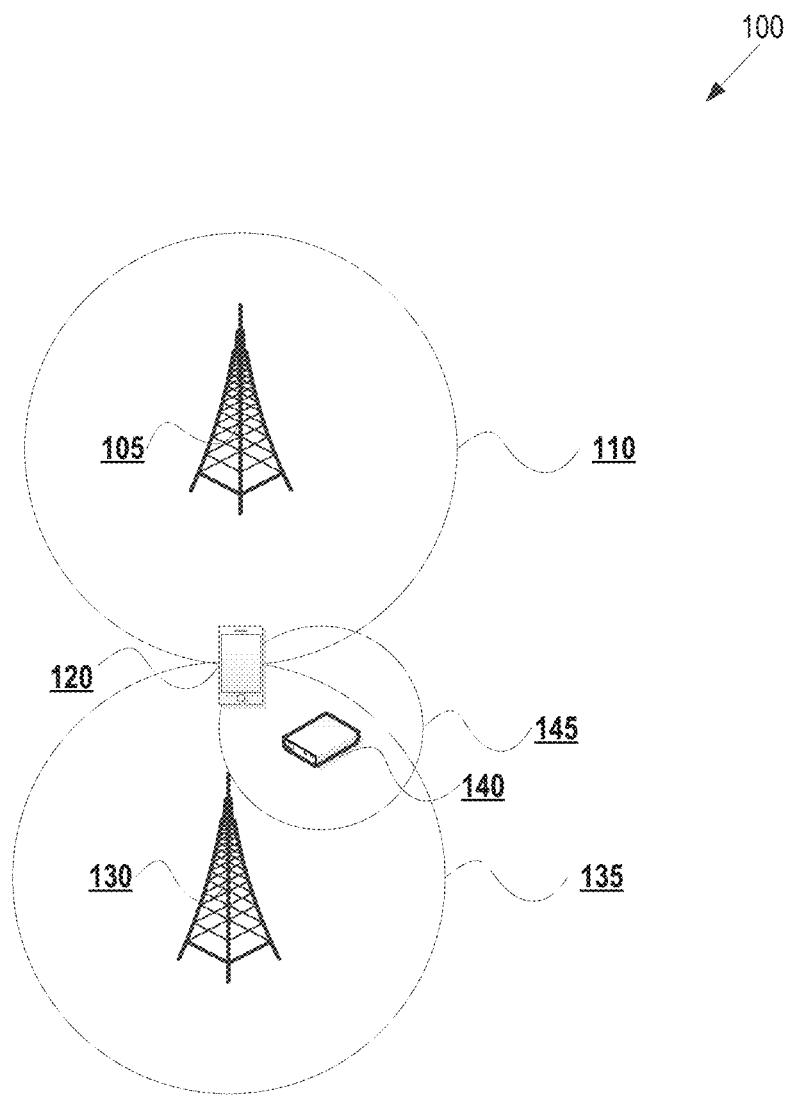
FIG. 1 is a block diagram illustrating an environment in which a UE may be adapted for dual connectivity, in accordance with various embodiments

Beginning first with FIG. 1, a block diagram shows an environment 100 in which a user equipment ("UE") 120 may be adapted for dual connectivity, in accordance with various embodiments. The UE 120 may be any type of computing device equipped with broadband circuitry and adapted to operate on a cell (e.g., the cell 110) according to, for example, one or more $3^{rd}$ Generation Partnership Project ("3GPP") technical specifications. For example, the UE 120 may be a netbook, a tablet computer, a handheld computing device, a web-enabled appliance, a gaming device, a mobile phone, a smartphone, an eBook reader, a personal data assistant, or the like. In another embodiment, the UE 120 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

According to embodiments, the UE 120 may be configured for intersystem communication by operating on one or more wireless cells 110, 135. Because the UE 120 may be adapted to dual connectivity, the UE 120 may simultaneously operate on two wireless cells 110, 135 such that two evolved Node Bs ("eNBs") 105, 130 simultaneously provide the UE 120 with radio resources. In embodiments, both cells 110, 135 may be primary cells ("PCells"). The UE 120 may simultaneously operate in a Radio Resource Control ("RRC") connected ("$RRC_{13}$ Connected") state on both cells 110, 135.

The first wireless cell 110 may be provided by a first eNB 105. In dual connectivity, the first eNB 105 may be a master eNB and, therefore, may terminate the S1-Mobility Management Entity ("MME") interface. Further, the master eNB 105 may act as a mobility anchor towards a core network (not shown). The master eNB 105 may be part of a master cell group ("MCG") that includes other serving cells (not shown) associated with the master eNB 105, such as small cells.

The second wireless cell 135 may be provided by a second eNB 130. In dual connectivity, the second eNB 130 may be a secondary eNB, which may be an eNB that is to provide radio resource to the UE 120 but is not the master eNB. The secondary eNB 130 may be part of a secondary cell group ("SCG") that includes other secondary cells ("SCells") associated with the secondary eNB 135, such as a small cell 145 provided by a low-powered radio access node 140. In embodiments, the PCell 135 of the SCG may be referred to by the abbreviation "PSCell." For dual connectivity of the UE 120, the master eNB 105 and the secondary eNB 130 may be connected through non-ideal backhaul (e.g., via the X2 interface).

The eNBs 105, 130 may connect the UE 120 to a core network as part of, for example, a third Generation ("3G"), fourth Generation ("4G"), fifth Generation ("5G"), or beyond system that adheres to one or more standards, such as Long Term Evolution ("LTE"), LTE-Advanced ("LTE-A"), or other similar standard.

The UE 120 may transmit uplink data to both the master eNB 105 and the secondary eNB 130. However, the transmission power of the UE 120 may be constrained, for example, by the capabilities of transmitter circuitry in the UE 120 and/or by interference considerations. Therefore, the UE 120 may be adapted to calculate or estimate its power headroom ("PHR"), which may be the transmission power left for the UE 120 to use (in addition to power being used by current transmission).

In various embodiments, the UE 120 may be adapted to estimate two types of PHR values: Type 1 and Type 2. The Type 1 PHR takes into account the Physical Uplink Shared Channel ("PUSCH") transmission power. The Type 2 PHR takes into account the PUSCH and the Physical Uplink Control Channel ("PUCCH") transmission powers. The Type 2 PHR may only be reported to eNBs providing PCells.

At each of the eNBs 105, 130, the PHR values provide information associated with the difference between the nominal maximum transmission power for the UE 120 and the estimated power for uplink-shared channel ("UL-SCH") transmission per activated serving cell. The PHR values may further provide information associated with the difference between the nominal maximum transmission power for the UE 120 and the estimated power for UL-SCH and PUCCH transmissions on PCells (e.g., cells 110, 135).

The UE 120 may be adapted to estimate PHR values for each of the serving cells 110, 135, 145. The UE 120 may estimate Type 2 and Type 1 PHR values for PCells 110, 135 and Type 1 PHR values for the SCell 145. These PHR values may be reported where the UE 120 is configured for extended PHR, which may be configured by at least one of the eNBs 105, 130 through RRC.

The UE 120 may be adapted to cause the plurality of estimated PHR values to be provided to all of the serving nodes 105, 130, 140. According to one embodiment, the UE 120 may transmit the PHR values to the serving nodes 105, 130, 140 (e.g., as individual transmissions or included together). In another embodiment, the UE 120 may transmit the PHR values (e.g., together or individually) to one of the eNBs 105, 130. That eNB could then share it with the other eNB over the X2 interface. Similarly, the secondary eNB 130 may share PHR values with the low-powered radio access node 140 over the X2 interface. In a third embodiment, the UE 120 may transmit a PHR value estimated for the master eNB 105 to the master eNB 105 and transmit PHR values for the secondary eNB 130 and node 140 to the secondary eNB 130. The master eNB 05 and the secondary eNB 130 may then share respective PHR values over the X2 interface.

The UE 120 may determine that the PHR values are to be reported to the serving nodes 105, 130, 140 based on at least one event. If the UE 120 determines that a PHR values is to be reported for at least one of the serving nodes 105, 130, 140, then the UE 120 may cause the PHR values for all serving nodes 105, 130, 140 to be reported. In one embodiment, the event may be the addition and/or removal of a serving node. In another embodiment, the event may be reception, by the UE 120, of a request to transmit PHR values from a serving node 105, 130, 140. In a third embodiment, the event may be an instruction from a higher layer (e.g., an application layer, media access control layer, etc.) of the UE 120.

According to some embodiments, the event may be the expiration of at least one timer. Therefore, the UE 120 may include one or more timers and determine that the PHR values are to be reported based on the one or more timers. In one embodiment, the UE 120 may include two periodic PHR timers, and each periodic PHR timer may be associated with an eNB 105, 130. At the expiration of at least one of the periodic PHR timers, the UE 120 may determine that the PHR values are to be reported to the serving nodes 105, 130, 140, and may transmit those PHR values.

According to another embodiment, the UE 120 include two prohibit PHR timers, and each prohibit PHR timer may be associated with an eNB 105, 130. At the expiration of at least one of the prohibit PHR timers, the UE 120 may determine if the pathloss associated with one of the eNBs 105, 130 has changed in excess (or equal to) a predetermined threshold amount. If the UE 120 determines that, for an eNB 105, 130, both the associated prohibit timer has expired and the pathloss has changed beyond the predetermined threshold amount, the UE 120 may cause the PHR values to be transmitted to the serving node 105, 130, 140.

In various embodiments, the eNBs 105, 130 may signal their respective periodic and prohibit timer durations to the UE 120 in an information element (e.g., a MAC-MainConfig information element). Further, the eNBs 105, 130 may signal their respective threshold amounts (e.g., in decibels) associated with pathloss change.

In some embodiments, the UE 120 may refrain from reporting PHR values when the required power backoff due to power management decreases temporarily (e.g., for up to a few tens of milliseconds). Further, the UE 120 should avoid reflecting such temporary decrease values in the $P_{CMAX,c}$ and/or power headroom fields when reporting the PHR values.

During preamble transmission (e.g., during a random access preamble procedure with one of the eNBs 105, 130), the UE 120 may go up to its maximum allowable transmission power. The UE 120 may report this to the eNB 105, 130 to which it is transmitting the preamble—e.g., the UE 120 may set a bit ("maxTxPowerReached") to indicate that the maximum transmission power for the UE 120 has been reached. When the UE 120 is dually connected to the eNBs 105, 130, the probability increases that UE 120 will reach the maximum transmission power. The reporting of PHR values to the eNBs 105, 130 may mitigate this possibility. Further, the UE 120 and/or the eNBs 105, 130 may apply power-scaling rules (e.g., power-scaling rules associated with carrier aggregation) to prevent the UE 120 from reachined the maximum transmission power.

Figure 2:
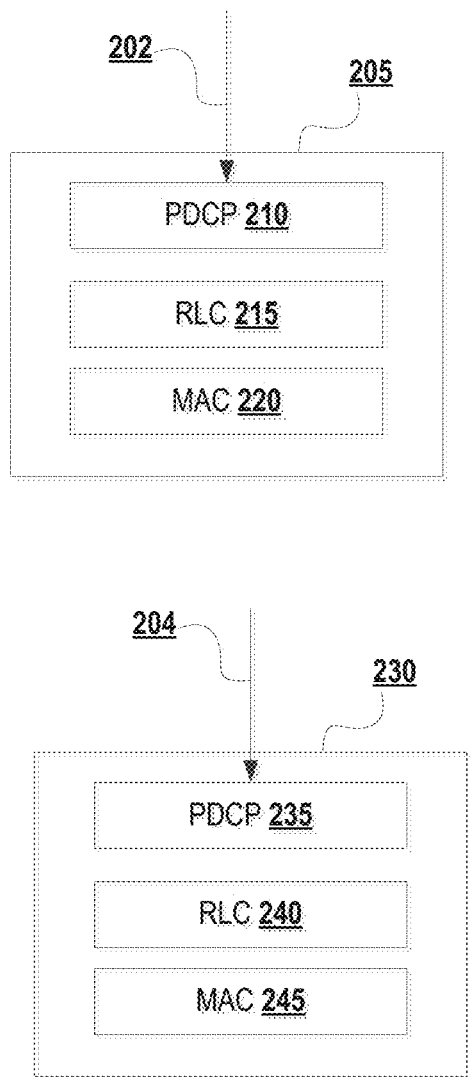
FIG. 2 is a block diagram illustrating the architectures of two eNBs to serve a dually connected UE, in accordance with various embodiments.

With respect to FIG. 2, a block diagram illustrates the architectures of two eNBs 205, 230, in accordance with various embodiments. The eNBs 205, 230 may be embodiments of the eNBs 105, 130 illustrated in FIG. 1. In various embodiments, each eNB 205, 230 may be adapted to provide a wireless cell on which a UE may operate.

According to embodiments, a first eNB 205 may be a master eNB. In dual connectivity environments, the master eNB 205 may be an eNB that terminates the Si Mobility Management Entity ("MME"). Therefore, the master eNB 205 may act as a mobility anchor toward a core network. In various embodiments, the master eNB 205 may be adapted to provide radio resources to a UE while the UE operates in an RRC_Connected state associated with the wireless cell provided by the master eNB 205.

According to embodiments, a second eNB 230 may be a secondary eNB. In dual connectivity environments, the secondary eNB 230 may be an eNB that provides additional radio resources to a dually connected UE, but is not the master eNB 205. The master eNB 205 and the secondary eNB 230 may be connected with non-ideal backhaul, for example, using the X2 interface. In various embodiments, the secondary eNB 230 may be adapted to provide radio resources to a UE while the UE operates in an RRC_Connected state associated with the wireless cell provided by the secondary eNB 230.

In the embodiment illustrated in FIG. 2, bearers 202, 204 (e.g., data streams through an Evolved Packet Switched System ("EPS") to an eNB and UE) may not be split, but may be independently received at the master eNB 205 and the secondary eNB 230. In such embodiments, a first bearer 202 may be received at the master UE 205 and a second bearer 204 may be independently received at the secondary UE 230. The bearers 202, 204 may be received at the respective eNBs 205, 230 through the S1 interface, and the S1-U may terminate at the secondary eNB 230.

Due to the independent reception of the bearers 202, 204, the master eNB 205 and the secondary eNB 230 may include separate Packet Data Convergence Protocol ("PDCP") layer entities 210, 235. At each eNB 205, 230, the PDCP layer entities 210, 235 may be associated with, for example, interface control over the radio network and user planes toward the Evolved Packet Core ("EPC"). Further, the PDCP layer entities 210, 235 may perform compression and decompression of Internet protocol ("IP") headers. The PDCP layer entities 210, 235 may be communicatively coupled with respective Radio Link Control ("RLC") layer entities 215, 240. The RLC layer entities 215, 240 may provide, for example, concatenation, segmentation, and/or reassembly of data units (e.g., protocol data units and/or service data units), sequential delivery of data units, duplication detection, error recovery, and the like for communication between the EPC and the UE. Additionally, respective RLC layer entities 215, 240 may be communicatively coupled with respective Media Access Control ("MAC") layer entities 220, 245. The MAC layer entities 220, 245 may provide addressing and channel access mechanisms, as well as interfacing with respective physical ("PHY") layer entities of the eNBs 205, 230 so that the bearers 202, 204 may reach the dually connected UE.

Figure 3:
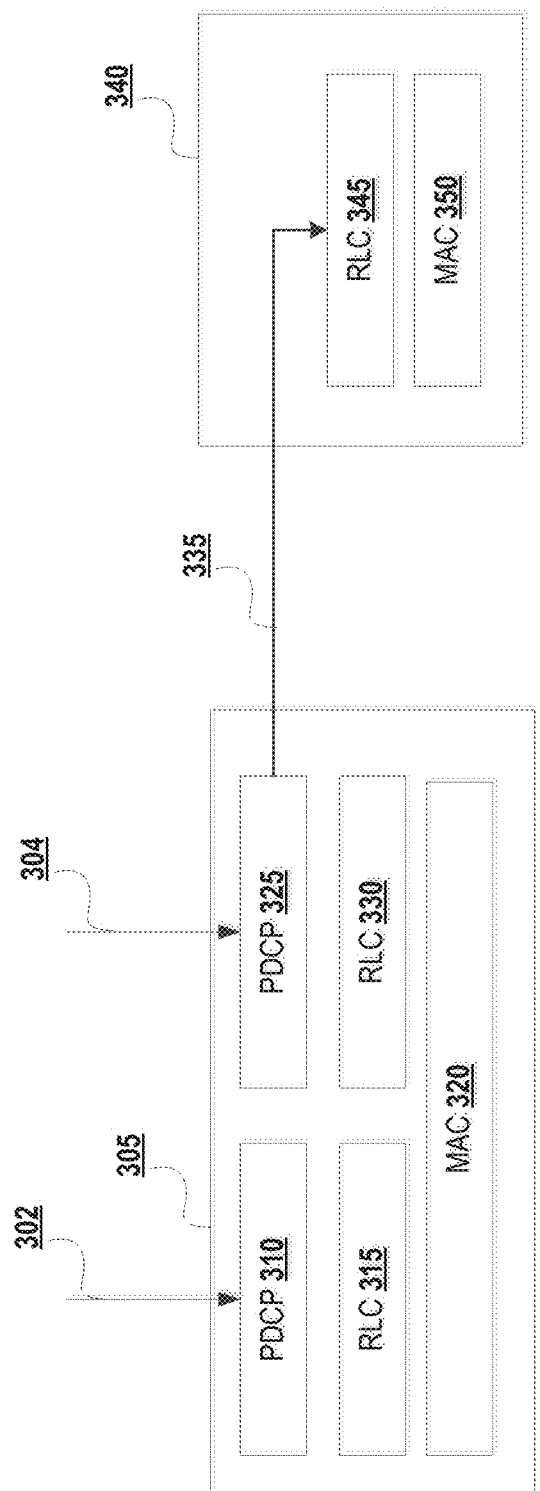
FIG. 3 is a block diagram illustrating other architectures of two eNBs to serve a dually connected UE, in accordance with various embodiments.

Turning to FIG. 3, a block diagram illustrates the architectures of two eNBs 305, 340, in accordance with various embodiments. The eNBs 305, 340 may be embodiments of the eNBs 105, 130 illustrated in FIG. 1. In various embodiments, each eNB 305, 340 may be adapted to provide a wireless cell on which a dually connected UE may operate.

According to embodiments, the first eNB 305 may be the master eNB and may act as a mobility anchor toward a core network. The second eNB 340 may be a secondary eNB. The master eNB 305 and the secondary eNB 340 may be connected with non-ideal backhaul, for example, using an X2 interface connection 335.

In embodiments, bearers 302, 304 may be both received at the master eNB 305 and bearer split may be employed at master eNB 305. The master eNB 305 may process the first bearer 302 according to the stack that includes a first PDCP layer entity 310, a first RLC layer entity 315, and MAC layer entity 320. In such embodiments, the S1-U may terminate at the master eNB 305. The master eNB 305 may split the second bearer 304 at the PDCP layer 325. At least part of the split bearer may then be processed at the master eNB 305 at the second RLC layer entity 330. The MAC layer entity 320 may process both the first bearer and the at least a part of the split bearer 304.

Because the eNBs are connected through backhaul, the master eNB 305 may transmit at least a part of the split bearer 304 to the secondary eNB 340 using the X2 interface connection 335. In some embodiments in which the bearer split occurs in the master eNB 305, data from the split bearer 304 may be received by the secondary eNB 340 at an independent RLC layer entity 345, which may be communicatively coupled with the MAC layer entity 350 of the secondary eNB 340. Accordingly, the master eNB 305 may receive EPS bearers 302, 304, but radio resources of the secondary eNB 340 may be used to provide the second bearer 304 to a dually connected UE.

Figure 4:
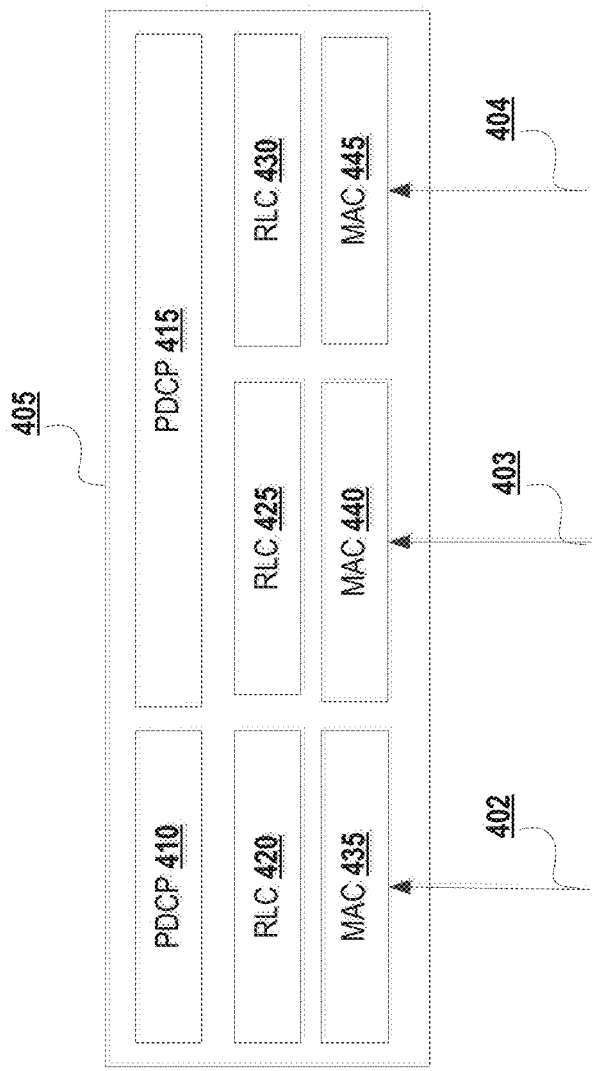
FIG. 4 is a block diagram illustrating the architecture of a UE that may operate in a dual connected mode, in accordance with various embodiments.

With reference to FIG. 4, a block diagram illustrates the architecture of a UE 405, in accordance with various embodiments. The UE 405 may be an embodiment of the UE 120 illustrated in FIG. 1. In various embodiments, a UE 405 may be adapted to operate on at least one wireless cell provided by an eNB.

According to embodiments, the UE 405 may be adapted to operate in a dual connected mode or state. That is, the UE 405 may be adapted to simultaneously operate on wireless PCells provided by a master eNB and a secondary eNB. In dual connectivity environments, the UE 405 may be simultaneously or contemporaneously provided radio resources by both the master eNB and the secondary eNB. Therefore, the UE 405 may simultaneously operate in an RRC Connected state associated with wireless PCells provided by the master eNB and the secondary eNB.

In the embodiment illustrated in FIG. 4, a bearer may be split at the master and secondary eNB and therefore bearers 403, 404 may be a split a split of a single bearer. Another bearer 402 may be independently received at the UE 405.

Due to the reception of the first bearer 402 and the split bearers 403, 404, the UE 405 may include three MAC layer entities 435, 440, 445. The MAC layer entities 435, 440, 445 may provide addressing and channel access mechanisms, as well as interfacing with one or more PHY layer entities (not shown) of the UE 405. The MAC layer entities 435, 440, 445 may be coupled with respective RLC layer entities 420, 425, 430. The RLC layer entities 420, 425, 430 may provide, for example, concatenation, segmentation, and/or reassembly of data units (e.g., protocol data units and/or service data units), sequential delivery of data units, duplication detection, error recovery, and the like for communication between the UE and the EPC.

The UE 405 may include separate PDCP layer entities 410, 415. The PDCP layer entities 210, 235 may be associated with, for example, interface control over the radio network and may perform compression and decompression of IP headers. A first RLC layer entity 420 may be coupled with a first PDCP layer entity 410. The first bearer 402 may be processed in the UE 405 through this stack of entities 410, 420, 435. Second and third RLC layer entities 425, 430 may be coupled with a second PDCP layer entity 415. The split bearer 403, 404 may be processed in the UE 405 through separate MAC layer entities 440, 445 and RLC layer entities 425, 430. At the second PDCP layer entity 415, the split bearer 403, 404 may be processed together.

Figure 5:
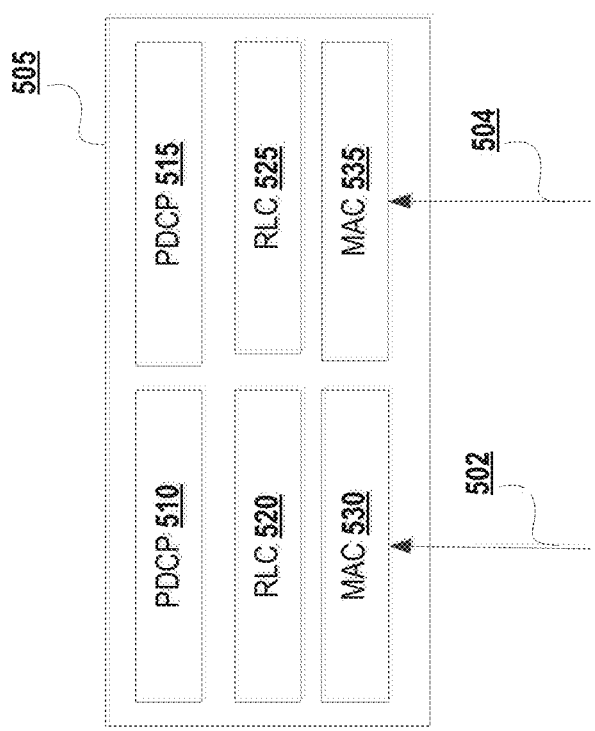
FIG. 5 is a block diagram illustrating another architecture of a UE that may operate in a dual connected mode, in accordance with various embodiments.

At FIG. 5, a block diagram illustrates the architecture of a UE 505, in accordance with various embodiments. The UE 505 may be an embodiment of the UE 120 illustrated in FIG. 1. In various embodiments, a UE 505 may be adapted to operate on at least one wireless cell provided by an eNB.

According to embodiments, the UE 505 may be adapted to operate in a dual connected mode or state. That is, the UE 505 may be adapted to simultaneously operate on wireless PCells provided by a master eNB and a secondary eNB. In dual connectivity environments, the UE 505 may be simultaneously or contemporaneously provided radio resources by both the master eNB and the secondary eNB. Therefore, the UE 505 may simultaneously operate in an RRC_Connected state associated with wireless PCells provided by the master eNB and the secondary eNB. In the illustrated embodiment, two bearers may be independently received at the UE 505—a first bearer 502 from the master eNB and a second bearer 504 from the secondary eNB.

Due to the independent reception of the first bearer 508 and the second bearer 504, the UE 505 may include two MAC layer entities 530, 535. The MAC layer entities 530, 535 may be coupled with respective RLC layer entities 520, 525. Further, the RLC layer entities 520, 525 may be coupled with respective PDCP layer entities 510, 515. With no bearer split, the bearers 502, 504 may be processed through the first entity stack 510, 520, 530 and the second entity stack 515, 525, 535, respectively.

Figure 6:
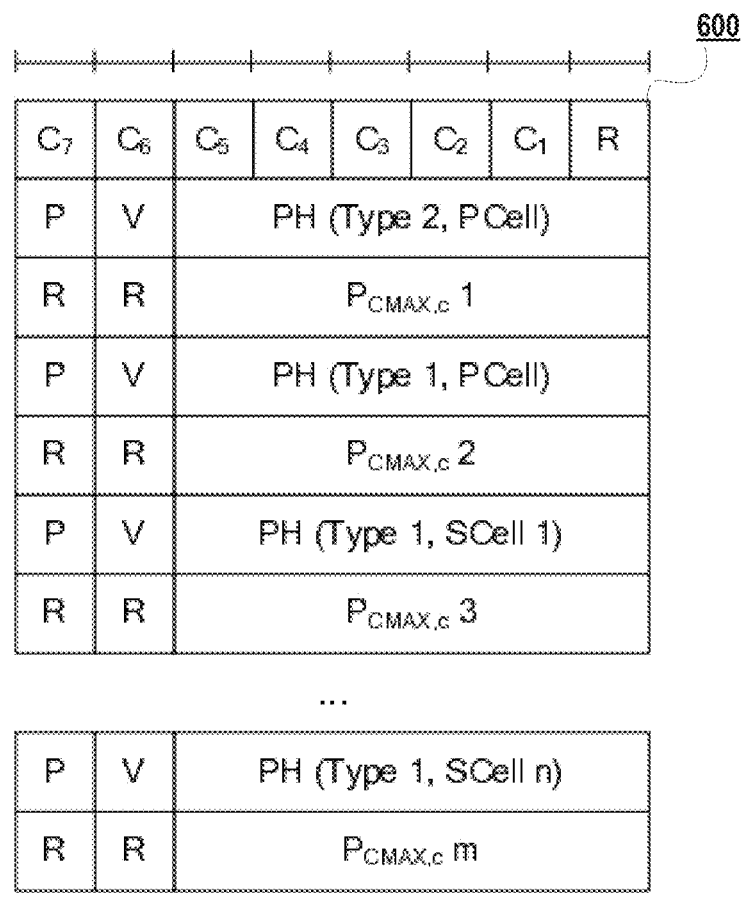
FIG. 6 is a block diagram illustrating a Media Access Control ("MAC") control element, in accordance with various embodiments.

Now with reference to FIG. 6, a block diagram illustrates a MAC control element 600 associated with extended PHR, in accordance with various embodiments. The MAC control element 600 may be included in MAC layer circuitry of a UE, such as a legacy UE that is not adapted for dual connectivity. Accordingly, the MAC control element 600 may be implemented to measure PHR associated with only one wireless cell.

In various embodiments, the "PH" fields may indicate a PHR value, as well as the type of PHR and whether it is for a PCell or an SCell. "R" fields may indicate reserved fields (e.g., fields set to a "0" bit). "V" fields may indicate if the PH fields are based on a real transmission or a reference format. "P" fields may indicate whether the UE is to apply power backoff due to power management.

In the MAC control element 600, multiple PHR values may be measured and reported. Each of the PHR values may be mapped to a different component carrier. When Type 2 PHR is reported, the octet containing the Type 2 PHR field may be included in a first and followed by an octet containing the associated $P_{CMAX,c}$ field (if reported), where $P_{CMAX,c}$ may be the maximum output power of the serving cell. Then follows an octet with the Type 1 PHR field and an octet with the associated $P_{CMAX,c}$ field (if reported), for the PCell and for each SCell.

In connection with FIG. 6, FIG. 7 shows a block diagram illustrating a MAC control element 700 associated with extended PHR for dual connectivity, in accordance with various embodiments. The MAC control element 700 may be included in MAC layer circuitry of a UE adapted for dual connectivity, such as the UE 120 of FIG. 1. Accordingly, the MAC control element 700 may be implemented to measure and/or estimate PHR associated with at least two wireless cells.

In the MAC control element 700, multiple PHR values may be measured and reported. Each of the PHR values may be mapped to a different component carrier. In embodiments, the MAC control element 700 may include values associated with PHR included in a plurality of octets 705 associated with a Master Cell Group ("MCG") that includes a master eNB. The MAC control element 700 may additionally include values associated with PHR included in a plurality of octets 710 associated with a Secondary Cell Group ("SCG") that includes a secondary eNB.

For the MCG, when Type 2 PHR is reported then the first octet of the MCG octets 705 of the MAC control element 700 may include the Type 2 PHR field associated with the PCell of the MCG and followed by an octet containing the associated $P_{CMAX,c}$ field (if reported). Following the first two octets may be octets associated with the Type 1 PHR field and octets with the associated $P_{CMAX,c}$ field (if reported) for the PCell and for each SCell of the MCG.

Similar to the MCG, the MAC control element 700 includes octets 710 associated with a SCG section. For the SCG, when Type 2 PHR is reported then the first octet of the SCG octets 710 of the MAC control element 700 may include the Type 2 PHR field associated with the PCell of the SCG and followed by an octet containing the associated $P_{CMAX,c}$ field (if reported). Following the first two octets may be octets associated with the Type 1 PHR field and octets with the associated $P_{CMAX,c}$ field (if reported) for the PCell and for each SCell of the SCG.

Based on the MAC control element 700, a UE may report PHRs associated with an MCG and an SCG to one or more eNBs, such as an eNB providing a PCell of the MCG and/or the eNB providing the PCell of the SCG. An eNB, such as a master eNB and/or secondary eNB, may signal the UE to report PHR(s) in dual connectivity, for example, using an information element. Such an information element may include fields associated with one or more timers (e.g., periodic timers and/or prohibit timers associated with the MCG and/or SCG) and/or pathloss change associated with the MCG and/or SCG. In one embodiment, a MAC-Main-Config information element may include the illustrated fields (FIG. 13) associated with respective periodic and prohibit timers for the MCG and SCG as well as respective pathloss change values associated with the MCG and SCG.

If a UE has uplink resources allocated for a new transmission during a transmission time interval, then the UE may begin one or more timers. In one embodiment, if the UE has a first uplink resource allocated for a new transmission since the last MAC reset, the UE may start one or more periodic PHR timers.

In embodiments in which extended PHR reporting is configured in the UE, the UE may report Type 1 PHR and/or Type 2 PHR values. If the allocated uplink resources can accommodate the PHR MAC control element 700 (and any associated headers), then the UE may obtain Type 1 PHR values for all serving cells. If the UE has uplink resources allocated for transmission to the serving cell for that transmission time interval, the UE may obtain the value corresponding to $P_{CMAX,c}$ from a physical layer of the UE. If the UE is configured for simultaneous PUCCH and PUSCH, then the UE may obtain the value of the Type 2 PHR value for the PCell(s) and obtain the value corresponding to $P_{CMAX,c}$ from a physical layer of the UE. The UE may then transmit a PHR MAC control element 700.

If the PHR reporting is not configured in the UE, then the UE may obtain Type 1 PHR value from the physical layer of the UE. The UE may then transmit a PHR MAC control element (which may not include all fields illustrated in FIG. 7).

After the UE has transmitted a MAC control element (e.g., the MAC control element 700), then the UE may restart at least one of the periodic and/or prohibit timers. Further, the UE may cancel any other PHR reports that may have been triggered during the transmission time interval.

Figure 8:
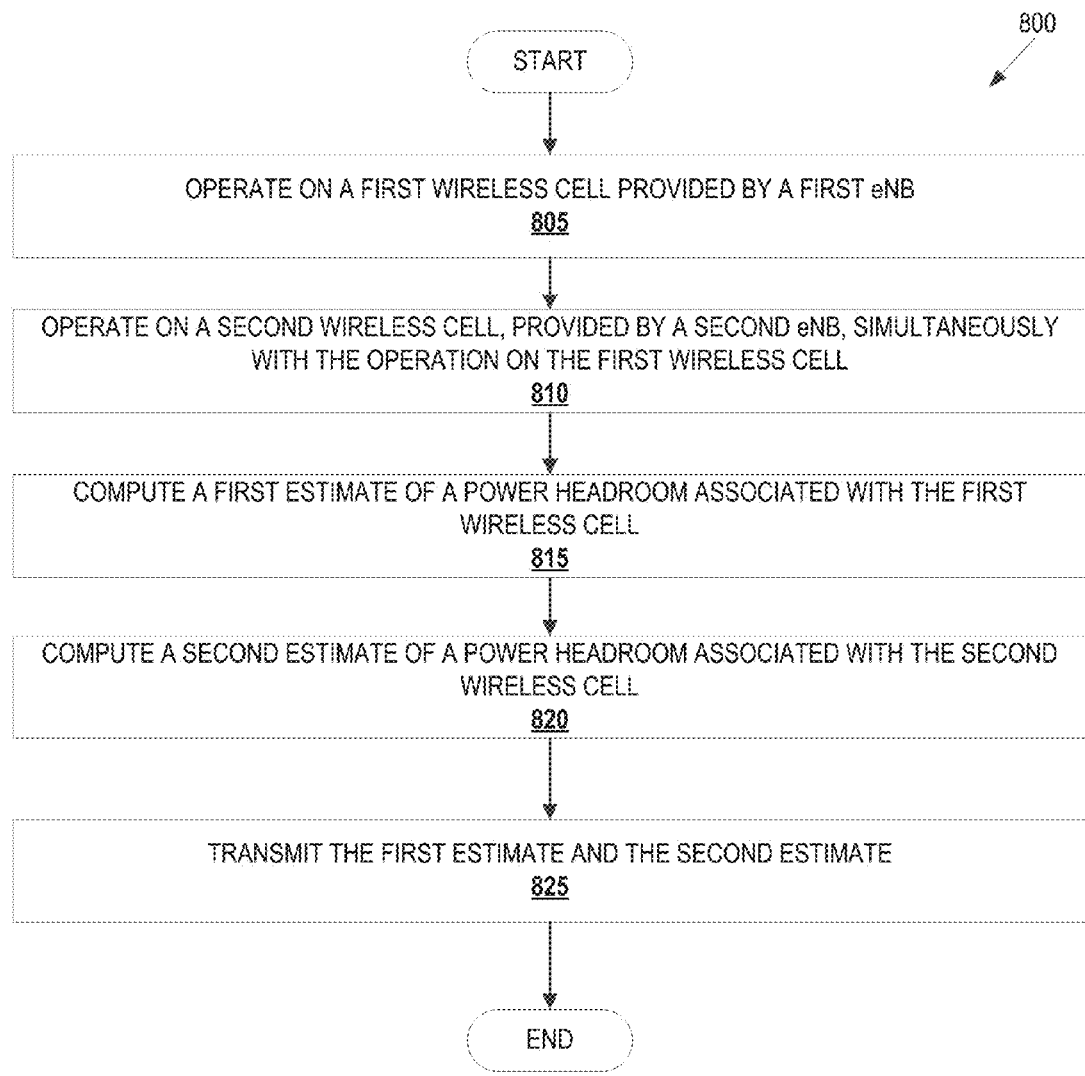
FIG. 8 is a flow diagram illustrating a method for estimating a plurality of PHR values associated with dual connectivity, in accordance with various embodiments.

With respect to FIG. 8, a flow diagram illustrates a method 800 for estimating a plurality of PHR values associated with dual connectivity, in accordance with various embodiments. The method 800 may be performed by a UE, such as the UE 120 of FIG. 1. While FIG. 8 illustrates a plurality of sequential operations, one of ordinary skill would understand that one or more operations of the method 800 may be transposed and/or performed contemporaneously.

To begin, the method 800 may include operation 805 for operating on a first wireless cell provided by a first eNB. The method 800 may further include an operation 810 for operating on a second wireless cell provided by a second eNB. The operating on the second wireless cell may simultaneously occur with the operating on the first wireless cell. Therefore, both eNB may simultaneously provide radio resources. For example, both eNBs may provide PCells to a UE and/or a UE may simultaneously operate in an RRC Connected state on both the first and second wireless cells.

At operation 815, the method 800 may include computing a first estimate of a PHR associated with the first wireless cell. This estimate PHR value may be the transmission power left for a UE to use for communication with the first eNB, in addition to power being used by a current transmission to the first eNB. Operation 820 may include computing a second estimate of a PHR associate with the second wireless cell. This second PHR value may be the transmission power left for the UE to use, which may be influenced (e.g., reduced) based on a current transmission to the first eNB.

Operation 825 may include transmitting the first estimate and the second estimate. According to one embodiment, the first and second estimates may be transmitted to the first and second eNBs (e.g., as individual transmissions or included together). In another embodiment, the first and second estimates may be transmitted (e.g., together or individually) to either the first eNB or the second eNB. That receiving eNB could then share it with the other eNB (e.g., over the X2 interface). In a third embodiment, the first estimate may be transmitted to the first eNB and the second estimate may be transmitted to the second eNB. The first eNB may then share the first estimate with the second eNB (e.g., or the X2 interface) and vice versa.

Figure 9:
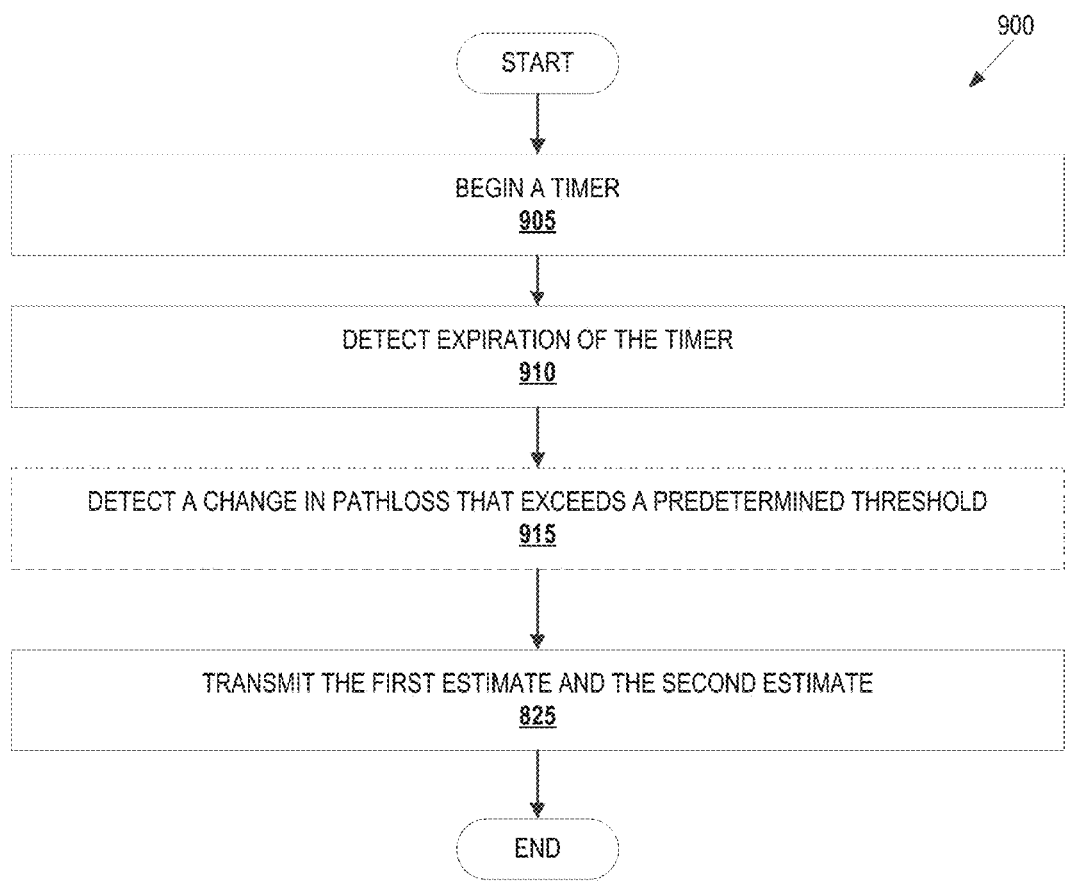
FIG. 9 is a flow diagram illustrating a method for transmitting first and second estimated PHR values based on detecting one or more event(s), in accordance with various embodiments.

With respect to FIG. 9, a flow diagram illustrates a method 900 for transmitting the first and second estimated PHR values based on detecting one or more event(s), in accordance with various embodiments. The method 900 may be performed by a UE, such as the UE 120 of FIG. 1. While FIG. 9 illustrates a plurality of sequential operations, one of ordinary skill would understand that one or more operations of the method 900 may be transposed and/or performed contemporaneously. The method 900 may be performed in connection with the method 800 of FIG. 8, and may illustrate one or more operations upon which transmission of PHR values is conditioned.

The method 900 may begin with operation 905 for beginning a timer. In various embodiments this timer may be a periodic timer or a prohibit timer. The timer may be associated with either a master eNB or a secondary eNB while a UE is operating in a dual connected mode. Operation 910 may comprise detecting expiration of the timer.

At operation 915, the method 900 may optionally include detecting a change in pathloss that exceeds a predetermined threshold. In various embodiments, this operation 915 may only be performed when the timer is a prohibit timer. The predetermined threshold may be based on a decibel value signaled by the same eNB with which the prohibit timer is associated. For example, if the prohibit timer is associated with the master eNB, then the detected pathloss would be associated with the master eNB based on a predetermined threshold signaled by the master eNB. Similarly, if the prohibit timer is associated with the secondary eNB, then the detected pathloss would be associated with the secondary eNB based on a predetermined threshold signaled by the secondary eNB. Operation 825 may include transmitted the first and second estimates, as described with respect to FIG. 8.

Figure 10:
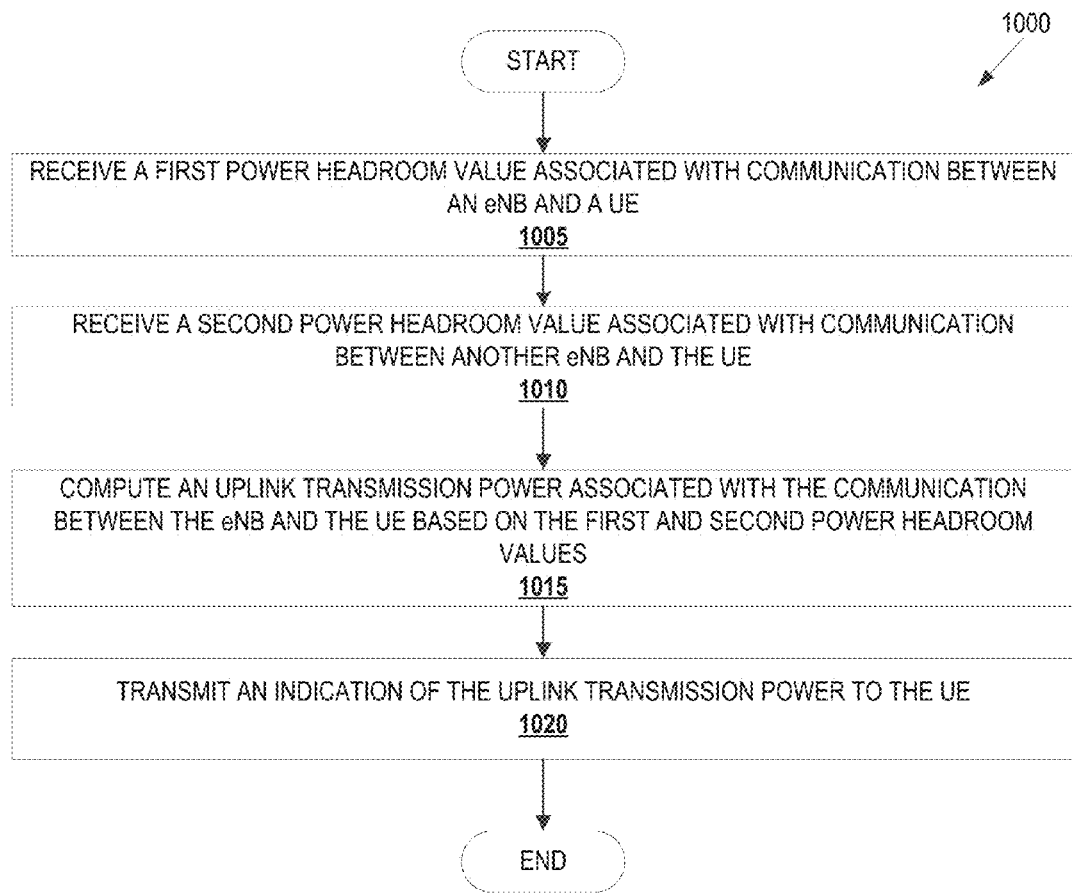
FIG. 10 is a flow diagram illustrating a method for computing an uplink transmission power associated with a UE adapted for dual connectivity, in accordance with various embodiments.

Turning to FIG. 10, a flow diagram illustrates a method 1000 for computing an uplink transmission power associated with a UE adapted for dual connectivity, in accordance with various embodiments. The method 1000 may be performed by an eNB, such as one of the eNBs 105, 130 of FIG. 1. While FIG. 10 illustrates a plurality of sequential operations, one of ordinary skill would understand that one or more operations of the method 1000 may be transposed and/or performed contemporaneously.

The method 1000 may begin with operation 1005 for receiving a first PHR value associated with communication between an eNB and a UE. The method 1000 may further include an operation 1010 for receiving a second PHR value associated with communication between another eNB and the UE. In various embodiments, the first PHR value and/or second PHR value may be signaled by the UE and/or the other eNB.

At operation 1015, the method 1000 may include computing an uplink transmission power associated with communication between the eNB and the UE. This operation 1015 may be based on the first and the second PHR values received. Accordingly, transmission power of a UE associated with communication with another eNB may influence the computing of the uplink transmission power. This approach may prevent an eNB from requesting a transmission power that would cause the UE to exceed its maximum allowable transmission power when the UE is operating in a dual connected mode. Accordingly, operation 1020 may include transmitting an indication of the uplink transmission power to the UE.

Figure 11:
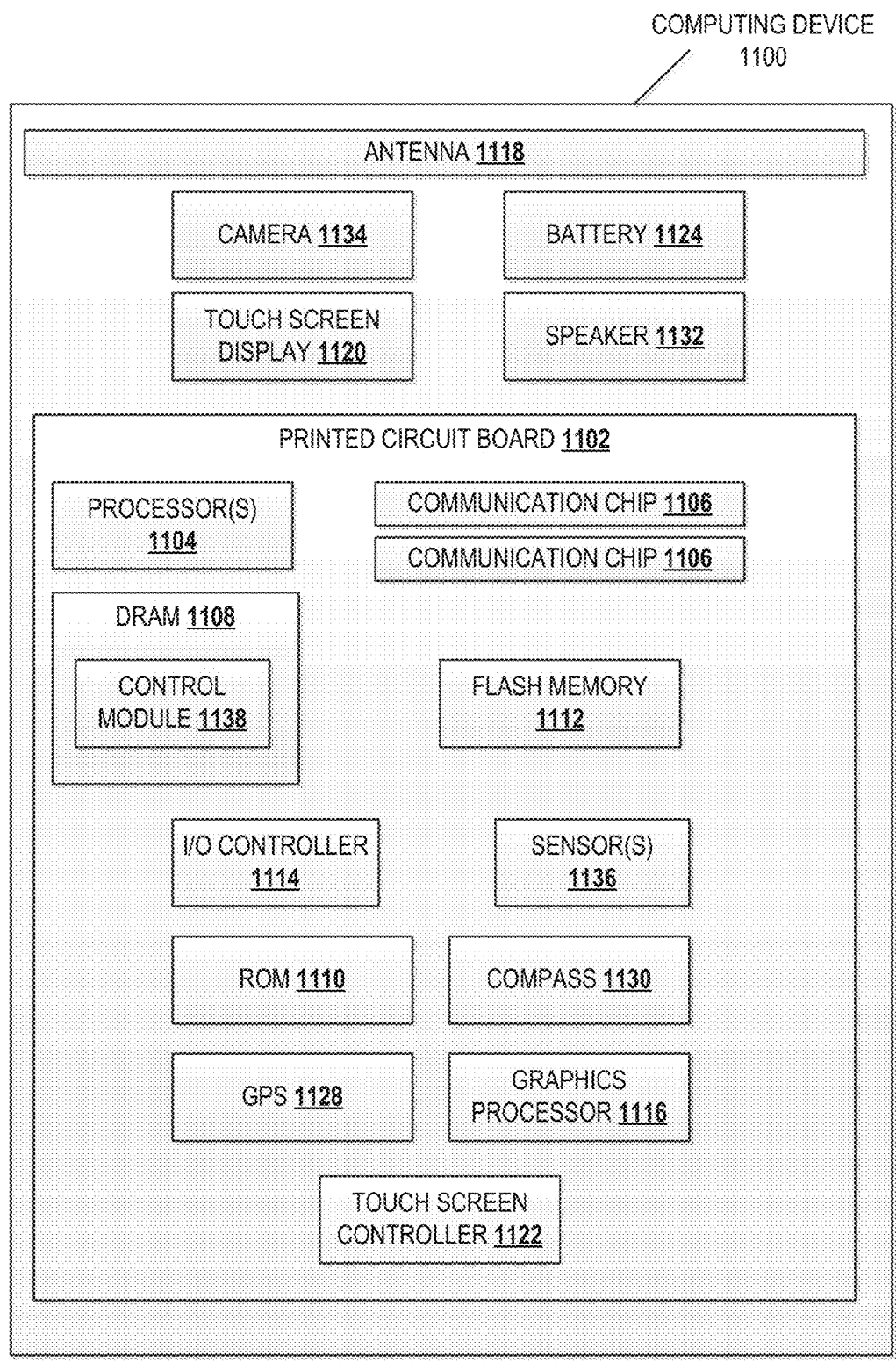
FIG. 11 is a block diagram illustrating a computing device adapted to operate in a wireless communication network, in accordance with various embodiments.

Now with reference to FIG. 11, a block diagram illustrates an example computing device 1100, in accordance with various embodiments. One of the eNBs 105, 130 and/or a UE 120 of FIG. 1 and described herein may be implemented on a computing device such as computing device 1100. Further, the computing device 1100 may be adapted to perform one or more operations of the method 800 described with respect to FIG. 8, the method 900 described with respect to FIG. 9, and/or the method 1000 described with respect to FIG. 10. The computing device 1100 may include a number of components, one or more processors 1104, and one or more communication chips 1106. Depending upon the embodiment, one or more of the enumerated components may comprise "circuitry" of the computing device 1100, such as processing circuitry, communication circuitry, and the like. In various embodiments, the one or more processor(s) 1104 each may be a processor core. In various embodiments, the one or more communication chips 1106 may be physically and electrically coupled with the one or more processor(s) 1104. In further implementations, the communication chips 1106 may be part of the one or more processor(s) 1104. In various embodiments, the computing device 1100 may include a printed circuit board ("PCB") 1102. For these embodiments, the one or more processor(s) 1104 and communication chip 1106 may be disposed thereon. In alternate embodiments, the various components may be coupled without the employment of the PCB 1102.

Depending upon its applications, the computing device 1100 may include other components that may or may not be physically and electrically coupled with the PCB 1102. These other components include, but are not limited to, volatile memory (e.g., dynamic random access memory 1108, also referred to as "DRAM"), non-volatile memory (e.g., read only memory 1110, also referred to as "ROM"), flash memory 1112, an input/output controller 1114, a digital signal processor (not shown), a crypto processor (not shown), a graphics processor 1116, one or more antenna(s) 1118, a display (not shown), a touch screen display 1120, a touch screen controller 1122, a battery 1124, an audio codec (not shown), a video code (not shown), a global navigation satellite system 1128, a compass 1130, an accelerometer (not shown), a gyroscope (not shown), a speaker 1132, a camera 1134, one or more sensors 1136 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 1104 may be integrated on the same die with other components to form a system on a chip ("SOC").

In various embodiments, volatile memory (e.g., DRAM 1108), non-volatile memory (e.g., ROM 1110), flash memory 1112, and the mass storage device (not shown) may include programming instructions configured to enable the computing device 1100, in response to the execution by one or more processor(s) 1104, to practice all or selected aspects of the data exchanges and methods described herein, depending on the embodiment of the computing device 1100 used to implement such data exchanges and methods. More specifically, one or more of the memory components (e.g., DRAM 1108, ROM 1110, flash memory 1112, and the mass storage device) may include temporal and/or persistent copies of instructions that, when executed by one or more processor(s) 1104, enable the computing device 1100 to operate one or more modules 1138 configured to practice all or selected aspects of the data exchanges and method described herein, depending on the embodiment of the computing device 1100 used to implement such data exchanges and methods.

The communication chips 1106 may enable wired and/or wireless communication for the transfer of data to and from the computing device 1100. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1106 may implement any of a number of wireless standards or protocols, including but not limited to LTE, LTE-A, Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 1100 may include a plurality of communication chips 1106 adapted to perform different communication functions. For example, a first communication chip 1106 may be dedicated to shorter range wireless communications, such as Wi-Fi and Bluetooth, whereas a second communication chip 1106 may be dedicated to longer range wireless communications, such as GPS, EDGE, GPRS, CDMA, WiMAX, LTE, LTE-A, Ev-DO, and the like.

FIG. 12 illustrates a device 1200 in accordance with some embodiments. The device 1200 may be similar to and/or included in one of the eNBs 105, 130 and/or the UE 120 of FIG. 1. The device 1200 may include processing circuitry 1202, transmitter circuitry 1205, receiver circuitry 1210, communications circuitry 1215, and one or more antennas 1220 coupled with each other at least as shown.

Briefly, the communications circuitry 1215 may be coupled with the antennas 1220 to facilitate over-the-air communication of signals to/from the device 1200. Operations of the communications circuitry 1215 may include, but are not limited to, filtering, amplifying, storing, modulating, demodulating, transforming, etc.

The transmitter circuitry 1205 may be coupled with the communications circuitry 1215 and may be configured to provide signals to the communications circuitry 1215 for transmission by the antennas 1220. In various embodiments, the transmitter circuitry 1205 may be configured to provide various signal processing operations on the signal to provide the signal to the communications circuitry 1215 with appropriate characteristics. In some embodiments, the transmitter circuitry 1205 may be adapted to generate signals. Further, the transmitter circuitry 1205 may be adapted to scramble, multiplex, and/or modulate various signals prior to transmission by the communications circuitry 1215.

The receiver circuitry 1210 may be coupled with the communications circuitry 1215 and may be configured to receive signals from the communications circuitry 1215. In some embodiments, the receiver circuitry 1210 may be adapted to generate signals. Further, the receiver circuitry 1210 may be adapted to descramble, de-multiplex, and/or demodulate various signals following reception by the communications circuitry 1215.

The processing circuitry 1202 may be coupled with the transmitter circuitry 1205, the receiver circuitry 1210, and/or the communications circuitry 1215. The processing circuitry may be adapted to perform operations described herein with respect to an eNB and/or a UE. In some embodiments, the processing circuitry 1202 may be adapted to generate, process, and/or manipulate data that is to be transmitted over the air, e.g., to and/or from an eNB and/or a UE. In particular, the processing circuitry 1202 may be adapted to perform operations associated with estimating and/or computing values associated with PHRs.

Some or all of the communications circuitry 1215, transmitter circuitry 1205, and/or receiver circuitry 1210 may be included in, for example, a communication chip and/or communicatively coupled with a printed circuit board as described with respect to FIG. 11.

In various embodiments, example 1 may be an apparatus to be included in a user equipment ("UE"), the apparatus comprising: processing circuitry to simultaneously operate on a first wireless primary cell ("PCell"), provided by a first eNB, and a second wireless PCell, provided by a second eNB, and to compute a first estimate of a power headroom ("PHR") associated with the first wireless cell and a second estimate of a PHR associated with the second wireless cell; and transmitter circuitry, coupled with the processing circuitry, to transmit the first estimate and the second estimate. Example 2 may include the apparatus of claim 1, wherein the transmitter circuitry is to send the second estimate to the first eNB. Example 3 may include the apparatus of claim 1, wherein the transmitter circuitry is to send the second estimate to the second eNB. Example 4 may include the apparatus of claim 1, wherein the transmitter circuitry is further to send the first estimate to the second eNB. Example 5 may include the apparatus of any of claims 1-4, wherein the processing circuitry is to detect a predetermined event, and further wherein the transmitter circuitry is to transmit the first estimate and the second estimate based on the detection of the predetermined event. Example 6 may include the apparatus of claim 5, wherein the predetermined event is associated with at least one of operation, by the processing circuitry, on a third wireless cell simultaneous with the operation on the first and second wireless cells. Example 7 may include the apparatus of claim 5, wherein the predetermined event is associated with termination of the operation on the second cell by the processing circuitry. Example 8 may include the apparatus of claim 5, wherein the predetermined event is associated with expiration of a first timer associated with the operation on the first cell or expiration of a second timer associated with the operation on the second cell. Example 9 may include the apparatus of claim 6, wherein the predetermined event is further associated with a pathloss value that exceeds a threshold value. Example 10 may include the apparatus of claim 5, wherein the predetermined event is associated with reception of a request to transmit the first estimate to the first eNB, the apparatus further comprising: receiver circuitry, coupled with the processing circuitry, to receive the request to transmit the first estimate to the first eNB. Example 11 may include the apparatus of any of claims 1-4, wherein the processing circuitry is further to detect that that a transmission power has reached a maximum value, and further wherein the transmitter circuitry is to transmit, to the first eNB, an indication that the transmission power has reached the maximum value.

In various embodiments, example 12 may be an apparatus to be included in an evolved Node B ("eNB"), the apparatus comprising: receiver circuitry to receive a first power headroom ("PHR") value associated with communication between the eNB and a user equipment ("UE") and a second PHR value associated with communication between another eNB and the UE; processing circuitry, coupled with the receiver circuitry, to determine an uplink transmission power associated with the communication between the eNB and the UE based on the first PHR value and the second PHR value; and transmitter circuitry, coupled with the processing circuitry, to transmit an indication of the uplink transmission power to the UE. Example 13 may include the apparatus of claim 12, wherein the processing circuitry is to cause the eNB to connect to the other eNB through non-ideal backhaul. Example 14 may include the apparatus of claim 12, wherein the receiver circuitry is further to receive an indication that the UE has reached a maximum transmission power, and the determination of the uplink transmission power is further based on the indication. Example 15 may include the apparatus of any of claims 12-14, wherein the receiver circuitry is to receive at least one of the first PHR value and second PHR value from the UE. Example 16 may include the apparatus of any of claims 12-14, wherein the receiver circuitry is to receive at least one of the first PHR value and the second PHR value from the other eNB using an X2 interface. Example 17 may include the apparatus of any of claims 12-14, wherein the transmitter circuitry is to transmit at least one of the first PHR value and the second PHR value to the other eNB using an X2 interface. Example 18 may include the apparatus of any of claims 12-14, wherein the processing circuitry is to generate a request for the UE to transmit the first and second PHR values, and further wherein the transmitter circuitry is to transmit the request to the UE. Example 19 may include the apparatus of any of claims 12-14, wherein the processing circuitry is to determine at least one duration associated with at least one timer and at least one pathloss threshold value, and further wherein the transmitter circuitry is to transmit the at least one duration and at least one pathloss threshold value to the UE for determination of PHR value reporting by the UE.

In various embodiments, example 20 may be one or more non-transitory computer-readable media comprising computing device-executable instructions, wherein the instructions, in response to execution by a user equipment ("UE"), cause the UE to: operate in a dual connectivity mode on a first wireless cell, provided by a first evolved Node B ("eNB"); operate on a second wireless cell, provided by a second eNB, simultaneously with the operation on the first wireless cell; compute a first power headroom ("PHR") value associated with the first wireless cell; compute a second PHR value associated with the second wireless cell; and transmit the first PHR value to at least one of the first eNB or the second eNB and transmit the second PHR value to at least one of the first eNB or the second eNB. Example 21 may include the one or more non-transitory computer-readable media of claim 20, wherein the instructions further cause the UE to: receive, from the first eNB, an indication of a transmission power associated with uplink communication between the UE and the first eNB; and adjust transmission power associated with the uplink communication to the first eNB based on the indication. Example 22 may include the one or more non-transitory computer-readable media of claim 20, wherein the instructions further cause the UE to detect a predetermined event, and further wherein the transmission of the first PHR value is based on the detection of the predetermined event.

In various embodiments, example 23 may include one or more non-transitory computer-readable media comprising computing device-executable instructions, wherein the instructions, in response to execution by an evolved Node B ("eNB"), cause the eNB to: receive a first power headroom ("PHR") value associated with communication between the eNB and a user equipment ("UE"); receive a second PHR value associated with communication between another eNB and the UE; calculate a transmission power value associated with the communication between the eNB and the UE based on the first PHR value and the second PHR value; and transmit an indication of the transmission power value to the UE. Example 24 may include the one or more non-transitory computer-readable media of claim 23, wherein the instructions further cause the eNB to receive an indication that the UE has reached a maximum transmission power, and further wherein the computation of the uplink transmission power is further based on the indication. Example 25 may include the one or more non-transitory computer-readable media of claim 23, wherein the instructions further cause the eNB to communicate at least one of the first PHR value and the second PHR value with the other eNB via an X2 interface.

In various embodiments, example 26 may be a method to be performed by a user equipment ("UE"), the method comprising: simultaneously operating on a first wireless primary cell ("PCell"), provided by a first eNB, and a second wireless PCell, provided by a second eNB; computing a first estimate of a power headroom ("PHR") associated with the first wireless cell; computing a second estimate of a PHR associated with the second wireless cell; transmitting the first estimate; and transmitting the second estimate. Example 27 may include the method of claim 26, wherein the second estimate is transmitted to the first eNB. Example 28 may include the method of claim 26, wherein the second estimate is transmitted to the second eNB. Example 29 may include the method of claim 26, wherein the first estimate is transmitted to the second eNB. Example 30 may include the method of any of claims 26-29, wherein the transmitting of the first estimate and the transmitting of the second estimate is based on detecting of a predetermined event, the method further comprising: detecting the predetermined event. Example 31 may include the method of claim 30, wherein the predetermined event is associated with operating on a third wireless cell simultaneous with the operation on the first and second wireless cells. Example 32 may include the method of claim 30, wherein the predetermined event is associated with termination of the operating on the second cell. Example 33 may include the method of claim 30, wherein the predetermined event is associated with expiration of a first timer associated with the operation on the first cell or expiration of a second timer associated with the operation on the second cell. Example 34 may include the method of claim 30, wherein the predetermined event is associated with reception of a request to transmit the first estimate to the first eNB, the method further comprising: receiving the request to transmit the first estimate to the first eNB.

In various embodiments, example 35 may be a method to be performed by an evolved Node B ("eNB"), the method comprising: receiving a first power headroom ("PHR") value associated with communication between the eNB and a user equipment ("UE"); receiving a second PHR value associated with communication between another eNB and the UE; determining an uplink transmission power associated with the communication between the eNB and the UE based on the first PHR value and the second PHR value; and transmitting an indication of the uplink transmission power to the UE. Example 36 may include the method of claim 35, further comprising: connecting to the other eNB through non-ideal backhaul. Example 37 may include the method of claim 35, further comprising: receiving an indication that the UE has reached a maximum transmission power, wherein the determining of the uplink transmission power is further based on the indication. Example 38 may include the method of any of claims 35-37, wherein at least one of the first PHR value and second PHR value are received from the UE. Example 39 may include the method of any of claims 35-37, wherein at least one of the first PHR value and the second PHR value are received from the other eNB using an X2 interface. Example 40 may include the apparatus of any of claims 35-37, further comprising: transmitting at least one of the first PHR value and the second PHR value to the other eNB using an X2 interface.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine-(e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. One or more non-transitory computer-readable media comprising compute device-executable instructions, wherein the instructions, in response to execution by a user equipment ("UE"), cause the UE to:
   generate a media access control ("MAC") control element associated with power headroom ("PHR") information for dual connectivity, wherein the MAC control element includes:
      one or more first octets associated with a master cell group, the one or more first octets to include a PHR value associated with a first wireless primary cell ("PCell") of the master cell group; and
      one or more second octets associated with a secondary cell group, the one or more second octets to include a PHR value associated with a second wireless PCell of the secondary cell group; and
   cause transmitter circuitry of the UE to transmit the MAC control element to one or more evolved Node Bs.

2. The one or more computer-readable media of claim 1, wherein the one or more first octets includes a first Type 2 PHR field to indicate the PHR value associated with the first wireless PCell based on a first Physical Uplink Control Channel ("PUCCH") transmission power, and the one or more second octets includes a second Type 2 PHR field to indicate the PHR value associated with the second wireless PCell based on a second PUCCH transmission power.

3. The one or more computer-readable media of claim 2, wherein the one or more first octets includes a first Type 1 PHR field to indicate the PHR value associated with the first wireless PCell based on a first Physical Uplink Shared Channel ("PUSCH") transmission power, and the one or more second octets includes a Type 1 PHR field to indicate the PHR value associated with the second wireless PCell based on a second PUSCH transmission power.

4. The one or more computer-readable media of claim 1, wherein the one or more first octets includes a first $P_{CMAX,c}$ field to indicate a maximum output power of the first wireless PCell, and the one or more second octets includes a second $P_{CMAX,c}$ field to indicate a maximum output power of the second wireless PCell.

5. The one or more computer-readable media of claim 1, wherein the instructions are further to cause the UE to monitor more than one periodic PHR timer to identify a time for transmission of the MAC control element.

6. An apparatus to be included in an evolved Node B ("eNB"), the apparatus comprising:
   transmitter circuitry; and
   processor circuitry coupled to the transmitter circuitry, the processor circuitry to:
   determine at least one duration that corresponds to at least one of more than one periodic power headroom ("PHR") timers to be used by a user equipment ("UE") to identify a time for transmission of PHR information for dual connectivity; and
   cause the transmitter circuitry to transmit a signal to the UE, the signal including at least one value based on the at least one duration;
   responsive to transmission of the signal, identify a received communication including a media access control ("MAC") control element, wherein the MAC control element includes:
      one or more first octets associated with a master cell group that corresponds to the eNB, the one or more first octets to include a PHR value associated with a first wireless primary cell ("PCell") of the master cell group; and
      one or more second octets associated with a secondary cell group that corresponds to a remote eNB, the one or more second octets to include a PHR value associated with a second wireless PCell of the secondary cell group.

7. The apparatus of claim 6, wherein the one or more first octets includes a first Type 2 PHR field to indicate the PHR value associated with the first wireless PCell based on a first Physical Uplink Control Channel ("PUCCH") transmission power, and the one or more second octets includes a second Type 2 PHR field to indicate the PHR value associated with the second wireless PCell based on a second PUCCH transmission power.

8. The apparatus of claim 7, wherein the one or more first octets includes a first Type 1 PHR field to indicate the PHR value associated with the first wireless PCell based on a first Physical Uplink Shared Channel ("PUSCH") transmission power, and the one or more second octets includes a Type 1 PHR field to indicate the PHR value associated with the second wireless PCell based on a second PUSCH transmission power.

9. The apparatus claim 7, wherein the one or more first octets includes a first $P_{CMAX,c}$ field to indicate a maximum output power of the first wireless PCell, and the one or more second octets includes a second $P_{CMAX,c}$ field to indicate a maximum output power of the second wireless PCell.

10. The apparatus of claim 6, the processor circuitry to cause the transmitter circuitry to transmit at least one of the PHR values to the remote eNB via an X2 interface.

11. The apparatus of claim 6, the processor circuitry to determine at least one pathloss threshold value that corresponds to said at least one of said more than one periodic PHR timers, wherein the signal includes the at least one pathloss threshold value.

12. The apparatus of claim 6, the processor circuitry to generate an information element to control the transmission of the PHR information, to cause the transmitter circuitry to transmit the signal responsive to generation of the information element.

13. The apparatus of claim 12, wherein the information element comprises a MAC-MainConfig information element including a periodic PHR timer field associated with the master cell group, a PHR timer field associated with the secondary cell group, a prohibit timer field associated with the master cell group, and a prohibit timer field associated with the secondary cell group.

14. The apparatus of claim 13, wherein the information element includes a master cell group pathloss change field and a secondary cell group pathloss change field.

15. An apparatus to be included in a user equipment ("UE"), the apparatus comprising:
    transmitter circuitry; and
    processor circuitry coupled to the transmitter circuitry, the processor circuitry to simultaneously operate on a first wireless primary cell ("PCell"), provided by a first eNB of a master cell group, and a second wireless PCell, provided by a second eNB of a secondary cell group, and to compute a power headroom ("PHR") value associated with the first wireless PCell and a PHR value associated with the second wireless PCell;
    the processor circuitry to generate a media access control ("MAC") control element, wherein the MAC control element includes:
        one or more first octets to include the PHR value associated with the first wireless PCell; and
        one or more second octets to include the PHR value associated with the second wireless PCell; and
    the processor circuitry to cause the transmitter circuitry to transmit the MAC control element to at least one of the eNBs.

16. The apparatus of claim 15, wherein the one or more first octets includes a first Type 2 PHR field to indicate the PHR value associated with the first wireless PCell based on a first Physical Uplink Control Channel ("PUCCH") transmission power, and the one or more second octets includes a second Type 2 PHR field to indicate the PHR value associated with the second wireless PCell based on a second PUCCH transmission power.

17. The apparatus of claim 16, wherein the one or more first octets includes a first Type 1 PHR field to indicate the PHR value associated with the first wireless PCell based on a first Physical Uplink Shared Channel ("PUSCH") transmission power, and the one or more second octets includes a Type 1 PHR field to indicate the PHR value associated with the second wireless PCell based on a second PUSCH transmission power.

18. The apparatus of claim 15, wherein the one or more first octets includes a first $P_{CMAX,c}$ field to indicate a maximum output power of the first wireless PCell, and the one or more second octets includes a second $P_{CMAX,c}$ field to indicate a maximum output power of the second wireless PCell.

19. The apparatus of claim 15, the processor circuitry to monitor more than one periodic PHR timer to identify a time for transmission of the MAC control element.

20. The apparatus of claim 15, the processor circuitry to cause the transmitter circuitry to transmit the MAC control element to the first eNB.

21. The apparatus of claim 15, the processor circuitry to cause the transmitter circuitry to transmit the MAC control element to the second eNB.

22. One or more non-transitory computer-readable media comprising compute device-executable instructions, wherein the instructions, in response to execution by a processor, cause the processor to:
    determine at least one duration that corresponds to at least one of more than one periodic power headroom ("PHR") timers to be used by a user equipment ("UE") to identify a time for transmission of PHR information for dual connectivity; and
    cause transmitter circuitry to transmit a signal to the UE, the signal including at least one value based on the at least one duration;
    responsive to transmission of the signal, identify a received communication including a media access control ("MAC") control element, wherein the MAC control element includes:
        one or more first octets associated with a master cell group that corresponds to a first evolved Node B ("eNB"), the one or more first octets to include a PHR value associated with a first wireless primary cell ("PCell") of the master cell group; and
        one or more second octets associated with a secondary cell group that corresponds to a second different eNB, the one or more second octets to include a PHR value associated with a second wireless PCell of the secondary cell group.

23. The one or more computer-readable media of claim 22, wherein the one or more first octets includes a first Type 2 PHR field to indicate the PHR value associated with the first wireless PCell based on a first Physical Uplink Control Channel ("PUCCH") transmission power, and the one or more second octets includes a second Type 2 PHR field to indicate the PHR value associated with the second wireless PCell based on a second PUCCH transmission power.

24. The one or more computer-readable media of claim 23, wherein the one or more first octets includes a first Type 1 PHR field to indicate the PHR value associated with the first wireless PCell based on a first Physical Uplink Shared Channel ("PUSCH") transmission power, and the one or more second octets includes a Type 1 PHR field to indicate the PHR value associated with the second wireless PCell based on a second PUSCH transmission power.

25. The one or more computer-readable media of claim 23, wherein the one or more first octets includes a first $P_{CMAX,c}$ field to indicate a maximum output power of the first wireless PCell, and the one or more second octets includes a second $P_{CMAX,c}$ field to indicate a maximum output power of the second wireless PCell.

26. The one or more non-transitory computer-readable media of claim 22, wherein the instructions are further cause the processor to transmit at least one of the PHR values from the first eNB to the second eNB via an X2 interface.

27. One or more non-transitory computer-readable media comprising compute device-executable instructions, wherein the instructions, in response to execution by a user equipment ("UE"), cause the UE to:
    generate a media access control ("MAC") control element associated with power headroom ("PHR") information for dual connectivity, wherein the MAC control element includes PHR values for a plurality of wireless primary cells ("PCells"), and wherein the MAC control element further includes:
        one or more first octets associated with a master cell group, wherein the one or more first octets includes one of the PHR values associated with a first wireless PCell of the plurality of wireless PCells; and
        one or more second octets associated with a secondary cell group, wherein the one or more second octets includes one of the PHR values associated with a second wireless PCell of the plurality of wireless PCells; and cause transmitter circuitry of the UE to transmit the MAC control element including said PHR values to one or more evolved Node Bs.

* * * * *